United States Patent
Lin et al.

(10) Patent No.: US 9,489,844 B2
(45) Date of Patent: Nov. 8, 2016

(54) APPARATUS FOR LOCATING A VEHICLE AND METHODS UTILIZING THE SAME

(71) Applicant: MediaTek Inc., Hsin-Chu (TW)

(72) Inventors: Che-Kuang Lin, New Taipei (TW); Yiou-Wen Cheng, Hsinchu (TW); Po-An Chen, Hsinchu (TW); Chien-Hua Chen, Hsinchu (TW); Yuan-Wen Ting, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 13 days.

(21) Appl. No.: 14/640,141

(22) Filed: Mar. 6, 2015

(65) Prior Publication Data

US 2016/0260327 A1  Sep. 8, 2016

(51) Int. Cl.
*H04W 4/02* (2009.01)
*G08G 1/123* (2006.01)
*G01S 19/25* (2010.01)
*H04W 64/00* (2009.01)
*H04W 68/00* (2009.01)
*G01S 5/00* (2006.01)

(52) U.S. Cl.
CPC ............ *G08G 1/123* (2013.01); *H04W 4/027* (2013.01); *H04W 4/028* (2013.01); *G01S 5/0027* (2013.01); *G01S 19/252* (2013.01); *H04W 64/006* (2013.01); *H04W 68/00* (2013.01)

(58) Field of Classification Search
CPC ...................................................... H04W 68/00
USPC ........................................................... 340/540
See application file for complete search history.

(56) References Cited

U.S. PATENT DOCUMENTS

| | | | | |
|---|---|---|---|---|
| 2011/0140922 A1* | 6/2011 | Levy | ...................... | G08G 1/144 340/932.2 |
| 2013/0290045 A1* | 10/2013 | Levy | ...................... | G08G 1/144 705/5 |
| 2013/0304414 A1* | 11/2013 | Levy | ...................... | G01C 22/006 702/141 |
| 2015/0087327 A1* | 3/2015 | Goyal | ...................... | G01S 19/34 455/456.1 |
| 2015/0156744 A1* | 6/2015 | Haro | ...................... | H04W 4/021 455/456.1 |

* cited by examiner

Primary Examiner — Steven Lim
Assistant Examiner — Benyam Haile
(74) Attorney, Agent, or Firm — McClure, Qualey & Rodack, LLP (57) ABSTRACT

A mobile device includes a motion detector, a processing unit, and a wireless positioning module. The motion detector is configured to detect a motion of the mobile device to obtain a motion signal. The processing unit is configured to do the followings: process the motion signal to obtain a vibration frequency and a vibration regularity of the mobile device; determine a device activity status of the mobile device according to the vibration frequency and the vibration regularity; and generate a control signal when finding that the device activity status switches from a first activity status to a second activity status. The wireless positioning module is configured to identify a first location of the mobile device in response to the control signal.

19 Claims, 8 Drawing Sheets

APPARATUS FOR LOCATING A VEHICLE AND METHODS UTILIZING THE SAME

BACKGROUND OF THE INVENTION

1. Field of the Invention

The invention relates generally to computing devices, mobile devices and methods for positioning, and more particularly, to vehicle locating devices and methods for locating a vehicle.

2. Description of the Related Art

Portable electronic devices, such as mobile phones and tablets, have become almost ubiquitous in today's life. With the prevalence of smart-phones, the portable electronic devices may execute many applications, such as surfing in the internet, video gaming, providing global positioning system (GPS) map, and so on. Henceforth, users usually keep their own portable electronic device with themselves, including going to different places for different activities by using vehicles, such as bicycles, motorcycles, automobiles and other transportation tools.

Just as finding a parking space is difficult, so is to remember the location of the parking space, especially in indoor or outdoor parking areas with hundreds or even thousands of vehicles parked within. Thus, it is desirable to devise a robust and automatic approach for remembering the vehicle parked location.

BRIEF SUMMARY OF THE INVENTION

A mobile device, and a vehicle locating method are provided. An exemplary embodiment of the mobile device comprises a motion detector, a processing unit, and a wireless positioning module. The motion detector is configured to detect a motion of the mobile device to obtain a motion signal. The processing unit is configured to do the followings: process the motion signal to obtain a vibration frequency and a vibration regularity of the mobile device; determine a device activity status of the mobile device according to the vibration frequency and the vibration regularity; and generate a control signal when finding that the device activity status switches from a first activity status to a second activity status. The wireless positioning module is configured to identify a first location of the mobile device in response to the control signal.

An exemplary embodiment of the vehicle locating method is provided. The vehicle locating method is for a mobile device having a motion detector. The vehicle locating method comprises the steps of: detecting, by the motion detector, a motion of the mobile device to obtain a motion signal; processing the motion signal to obtain a vibration frequency and a vibration regularity of the mobile device; determining a device activity status of the mobile device according to the vibration frequency and the vibration regularity; generating a control signal when finding that the device activity status switches from a first activity status to a second activity status; and initiating a procedure for location a first location of the mobile device in response to the control signal, wherein the first location of the mobile device corresponds to a space where a vehicle is parked.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
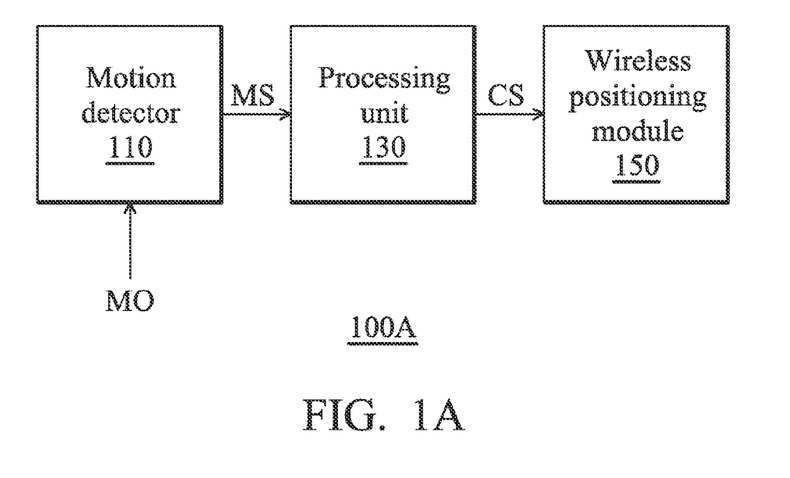
FIG. 1A is an exemplary block diagram of a mobile device according to an embodiment of the invention.

FIG. 1A is an exemplary block diagram of a mobile device according to an embodiment of the invention. The mobile device 100A comprises the motion detector 110, the processing unit 130 and the wireless positioning module 150. The motion detector 110 is configured to detect the motion MO of the mobile device 100A to obtain the motion signal MS. The processing unit 130 receives the motion signal MS and is configured to: process the motion signal MS to obtain a vibration frequency and a vibration regularity of the mobile device 100A; determine a device activity status of the mobile device 100A according to the vibration frequency and the vibration regularity; and generate the control signal CS when finding that the device activity status switches from a first activity status to a second activity status. The wireless positioning module 150 is configured to identify a first location of the mobile device in response to the control signal CS.

The input of the motion detector 110 is the motion MO of the mobile device 100A. The motion MO is generated from the movement, or more specifically the vibration, of the mobile device 100A. Vibration is oscillatory motion resulted from the application of oscillatory or varying forces to a structure. There are some features to characterize the vibratory motion, including a vibration frequency and a vibration regularity. The vibration frequency measures a period of the oscillatory motion whereas the vibration regularity measures the resemblance among different periods of the oscillatory motion. In practice, accelerometers may be designed to measure vibration by leveraging the piezoelectric effect. A piezoelectric accelerometer is an accelerometer that employs the piezoelectric effect of certain materials to measure dynamic changes in mechanical variables (e.g., acceleration or vibration). In a piezoelectric accelerometer, a mass applies force to a crystal, the crystal creating a high-impedance charge, which results in a voltage across the crystal. The voltage across the crystal may further go through an amplifier to amplify the change of the voltage, serving as an indication of the vibratory motion.

The processing unit 130 processes the motion signal MS in order to tell a device activity status of the mobile device 100A. The device activity status refers to whether, for example, the mobile device 100A is within a moving vehicle (user driving status) or is carried by a walking user (user walking status). To do this, changes of the vibration frequency and the vibration regularity of the mobile device 100A is utilized. The vibration frequency and the vibration regularity are known to exhibit different patterns under different physical environment and status where the mobile device 100A is within. In one embodiment, when the processing unit 130 finds that the device activity status of the mobile device 100A switches from a user driving status to a user walking status, the control signal CS is generated.

The wireless positioning module 150 may provide at least one of the functionality of an indoor positioning system (IPS) or a global positioning system (GPS). An IPS is a solution to locate objects or people inside a building by using radio waves, magnetic fields, acoustic signals, or other sensory information collected by mobile devices. In contrast, the GPS is a space-based satellite navigation system that provides location and time information under all weather conditions, anywhere on or near the Earth where there is an unobstructed line of sight to four or more GPS satellites. The wireless positioning module 150 is configured to identify a first location of the mobile device 100A in response to the control signal CS. If the control signal CS is generated at the right timing, i.e. at the time when a vehicle is just parked, the first location of the mobile device 100A identified by the wireless positioning module 150 records the location where the vehicle is parked.

According to an embodiment, the processing unit 130 is an instruction-based computing module, such as a general purpose processor, a central processing unit (CPU) or a digital signal processor (DSP). In another embodiment, the processing unit 130 is implemented by dedicate hardware logics and may be fabricated within an application specific integrated circuit (ASIC). According to another embodiment, the wireless positioning module 150 further stores the first location of the mobile device in a storage unit (not shown in FIG. 1A), such as a static random access memory (SRAM), a dynamic random access memory (DRAM) or a flash memory, so that the first location may be recorded for later usage. For instance, when the user finishes his/her own business yet forgets the vehicle parked location, the user may simply retrieve the first location to easily find where his/her vehicle is.

Figure 1B:
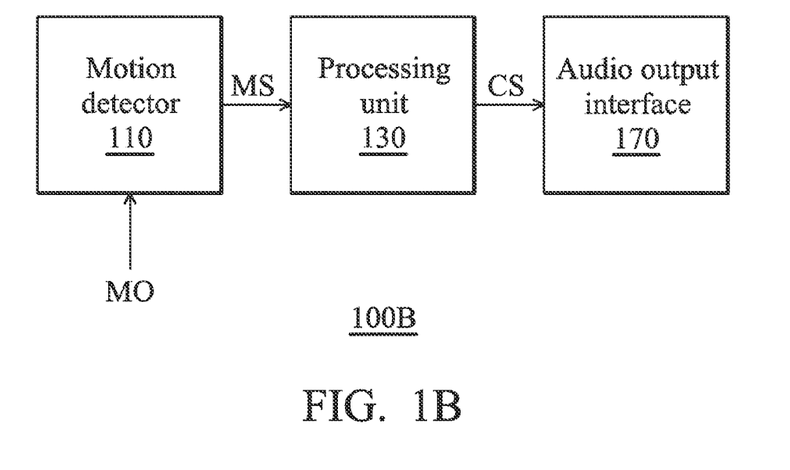
FIG. 1B is an exemplary block diagram of a mobile device according to another embodiment of the invention.

FIG. 1B is an exemplary block diagram of a mobile device according to another embodiment of the invention. The mobile device 100B comprises the motion detector 110, the processing unit 130, and the audio output interface 170. The difference between FIG. 1B and FIG. 1A is that the audio output interface 170 is added whereas the wireless positioning module 150 is removed. The audio output interface 170 is configured to generate a sound in response to the control signal CS. In one embodiment, when the sound is generated it reminds the user of the mobile device 100B to remember a current location, e.g. the location where a vehicle is parked.

Figure 1C:
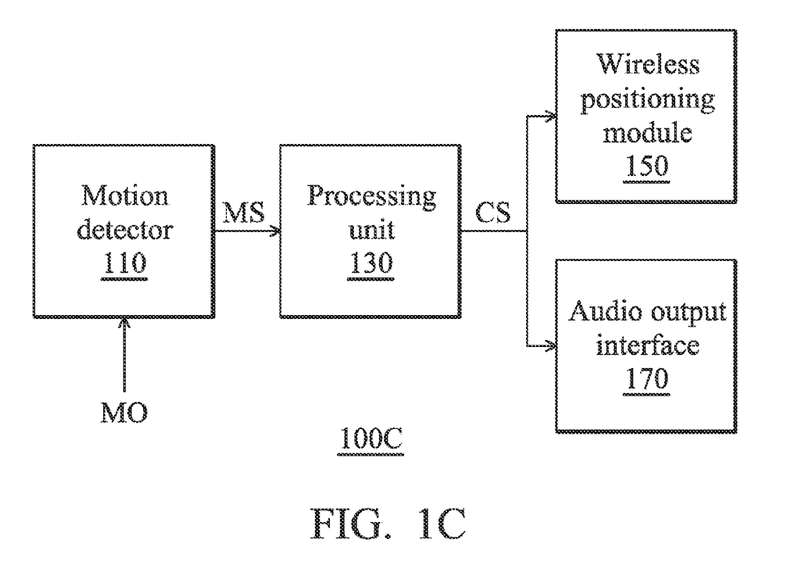
FIG. 1C is an exemplary block diagram of a mobile device according to still another embodiment of the invention.

FIG. 1C is an exemplary block diagram of a mobile device according to still another embodiment of the invention. The mobile device 100C comprises the motion detector 110, the processing unit 130, the wireless positioning module 150 and the audio output interface 170. Compared with FIG. 1A and FIG. 1B, both the wireless positioning module 150 and the audio output interface 170 are integrated within the mobile device 100C whereas only one of the wireless positioning module 150 and the audio output interface 170 is present in the mobile device 100A and 100B, respectively. In FIG. 1C, the wireless positioning module 150 is configured to identify a first location of the mobile device 100C in response to the control signal CS and the audio output interface 170 is configured to generate a sound in response to the control signal CS.

Figure 2A:
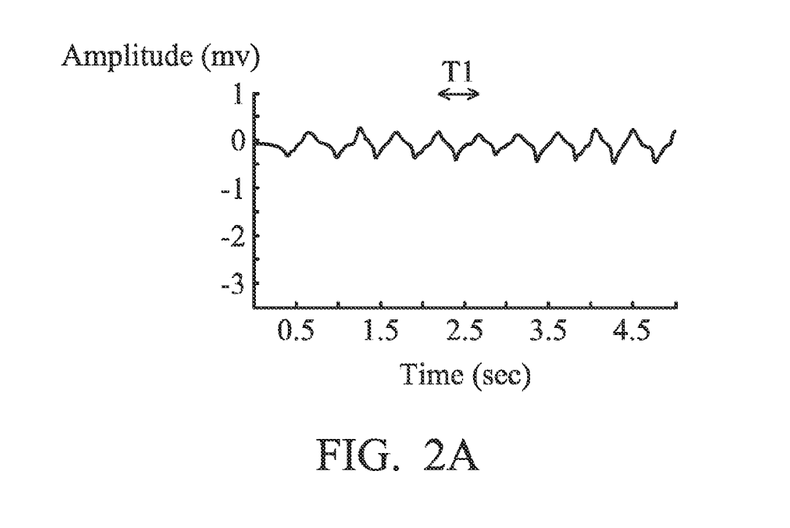
FIGS. 2A and 2B show example waveforms of a motion signal according to an embodiment of the invention.
Figure 2B:
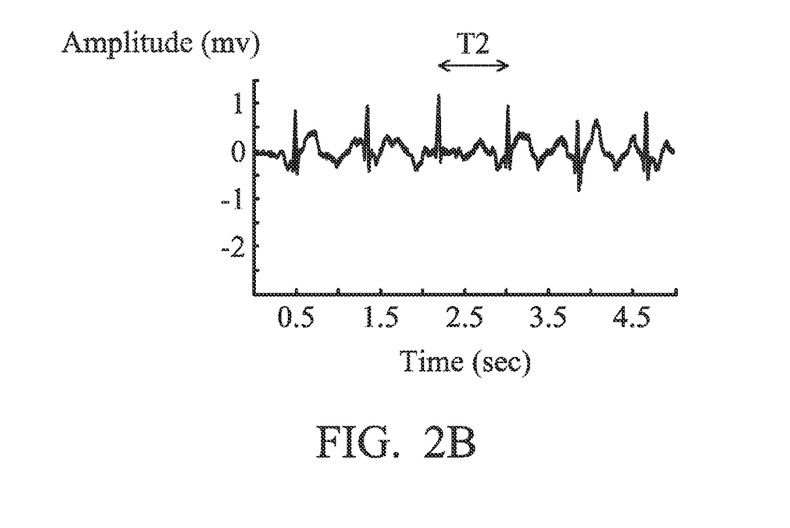

FIGS. 2A and 2B show example waveforms of a motion signal according to an embodiment of the invention. Please refer to FIGS. 2A and 2B in view of FIG. 1A. FIG. 2A shows a waveform of the motion signal MS obtained by the motion detector 110 when the mobile device 100A is inside a moving vehicle. FIG. 2B shows a waveform of the motion signal MS obtained by the motion detector 110 when the mobile device 100A is carried by a walking user. The waveforms in FIG. 2A and FIG. 2B can be understood as time domain amplitude profile of the motion signal MS generated because of vibration of the mobile device 100A. From FIG. 2A, it can be observed the waveform bears phenomenal periodic characteristic, roughly repeats itself with a period of T1 as well as high resemblance between different periods. In contrast, FIG. 2B also shows quite obvious periodic characteristic, roughly repeating itself with a period of T2. In this embodiment, T2 is larger than T1 and the resemblance between different periods in FIG. 2B is lower than that in FIG. 2A. This suggests the vibration frequency as well as the vibration regularity of the mobile device 100A change for the mobile device 100A being carried under different user activities, e.g. driving and walking Note that the vibration regularity may be a relative number with different expression. For instance, the vibration regularity is a percentage number, indicating higher regularity as the number approaching 100%. Hence, by processing the motion signal MS, it is feasible to distinguish when does a user switches from driving a vehicle to walking on the ground provided that the mobile device 100A is with the user.

Figure 3:
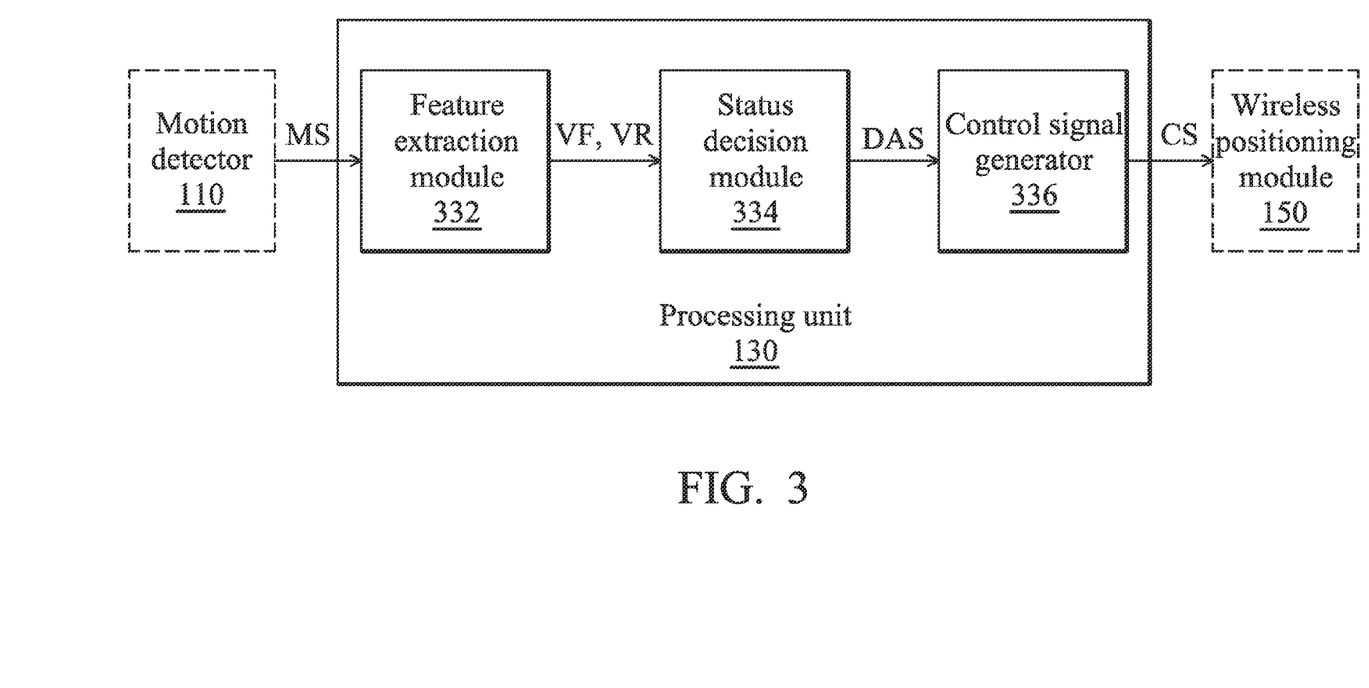
FIG. 3 shows a schematic diagram of a processing unit according to an embodiment of the invention.

FIG. 3 shows a schematic diagram of a processing unit 130 according to an embodiment of the invention. The processing unit 130 comprises the feature extraction module 332, the status decision module 334, and the control signal generator 336. FIG. 3 can be understood in light of FIG. 1A. The features extraction module 332 processes the motion signal MS to obtain the vibration frequency VF and the vibration regularity VR of the mobile device 100A. In one embodiment, the vibration frequency VF can be obtained by performing fast Fourier transform (FFT) on the motion signal MS and selecting the frequency tones with highest energy components. In another embodiment, the vibration regularity VR can be obtained by: (1) dividing the motion signal MS into several sections according to periodicity of the motion signal MS; and (2) for two sections, summing the absolute difference between corresponding points of the two sections. Then, the feature extraction module 332 may be implemented by a FFT circuit and some digital logics. The status decision module 334 determines the device activity status DAS of the mobile device 100A according to the vibration frequency VF and the vibration regularity VR. The control signal generator 336 generates the control signal CS when finding that the device activity status DAS switches from a first activity status to a second activity status.

Figure 4:
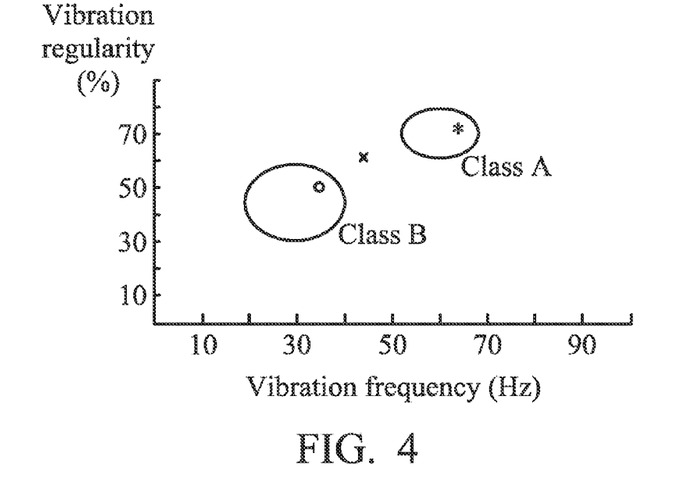
FIG. 4 shows a distribution of a vibration frequency and a vibration regularity of a mobile device in a 2-dimension (2D) coordinate.

FIG. 4 shows a distribution of a vibration frequency and a vibration regularity of a mobile device in a 2-dimension (2D) coordinate. Firstly, please refer to FIG. 4 in view of FIG. 3 and FIG. 2A. As mentioned earlier, the feature extraction module 332 processes the motion signal MS (shown in FIG. 2A) to obtain the vibration frequency VF and the vibration regularity VR of the mobile device 100A. Then the status decision module 334 determines that device activity status DAS of the mobile device 100A according to the vibration frequency VF and the vibration regularity VR. The device activity status DAS can be determined in several ways. In one embodiment, the status decision module 334 has pre-stored mapping information between device activity status DAS of the mobile device 100A and the vibration frequency VF and the vibration regularity VR. To be more specific, the pre-stored mapping information contains first ranges of the vibration frequency VF and vibration regularity VR when the mobile device 100A is within a moving vehicle; and contains second ranges of the vibration frequency VF and vibration regularity VR when the mobile device 100A is carried by a walking user. For instance, when within a moving vehicle (shown as class A in FIG. 4), the vibration frequency VF is roughly between 50 Hz to 70 Hz and the vibration regularity VR is between 60% and 80%, where higher percentage indicates higher vibration regularity. By comparing whether the vibration frequency VF and the vibration regularity VR provided by the feature extraction module 232 lie within the class A region, it can be known whether or not the mobile device 100A is within a moving vehicle and the device activity status DAS can be set accordingly. For the case of FIG. 2A, with the derived vibration frequency VF and the vibration regularity VR of the mobile device 100A lying within the class A region (denoted as the point '*'), the device activity status DAS may be a two-bit signal set as 2'b01 for representing the device activity status DAS of the mobile device 100A is in a user driving status.

Please now refer to FIG. 4 in view of FIG. 3 and FIG. 2B, which all together represent the scenario of the mobile device 100A being in a user walking status. By processing the motion signal MS (now shown as FIG. 2B), the feature extraction module 332 obtains the vibration frequency VF and the vibration regularity VR of the mobile device 100A. The difference between this paragraph and the previous paragraph is that now the vibration frequency VF and the vibration regularity VR lie within the class B region (denoted as the point 'o'), instead of the class A region. As such, the device activity status DAS may be set to 2'b10 by the status decision module 334 for representing the device activity status DAS of the mobile device 100A is in a user walking status. Note that, in one embodiment, the status decision module 334 may be implemented by some registers and comparators.

Please refer to FIG. 4 and FIG. 3 for still another embodiment of the invention. Unlike the motion signal MS shown in FIG. 2A and FIG. 2B, the vibration frequency VF and the vibration regularity VR of the mobile device 100A neither lies within the class A region nor within the class B region. In this embodiment, the vibration frequency VF and the vibration regularity obtained by the feature extraction module 332 lies at the point denoted as 'x' in FIG. 4. To deal with this sort of situation, simple comparison of ranges as discussed above may not work if the status decision module 334 still needs to determine a meaningful or reliable result of the device activity status DAS. More complex algorithms or advanced mathematical techniques have to be adopted instead. For example, the status decision module 334 may further observe several subsequent pairs of the vibration frequency VF and the vibration regularity VR before determining the device activity status DAS. If the subsequent pairs of the vibration frequency VF and the vibration regularity VR all reside within the class A region, the status decision module 334 may determine the device activity status DAS corresponding to the point 'x' is the user driving status. If the subsequent pairs of the vibration frequency VF and the vibration regularity VR all reside within the class B region, the status decision module 334 may determine the device activity status DAS corresponding to the point 'x' is the user walking status. If none of the subsequent pairs of the vibration frequency VF and the vibration regularity VR resides within the class A region or the class B region, the status decision module 334 may average the current and the subsequent pairs of the vibration frequency VF and the vibration regularity VR; and decide whether the average value is closer to the class A region or the class B region to determine the device activity status DAS.

Therefore, the device activity status DAS of the mobile device 100A can be determined according to the vibration frequency VF and the vibration regularity VR by doing the following. Firstly, map the vibration frequency VF and the vibration regularity VR to a point of a 2-dimension (2D) coordinate, wherein one axis of the 2D coordinate corresponds to the vibration frequency VF and the other axis of the 2D coordinate corresponds to the vibration regularity VR. In this embodiment, the vibration frequency VF corresponds to the horizontal axis and the vibration regularity VR corresponds to the vertical axis. Secondly, distinguish whether the point of the 2D coordinate resides within a first zone or a second zone. In this embodiment, the first zone stands for the union of the class A region and the class B region; and the second zone stands for other regions. Thirdly, adopt a first algorithm for determining the device activity status DAS when the point of the 2D coordinate resides within the first zone; or adopt a second algorithm for determining the device activity status DAS when the point of the 2D coordinate resides within the second zone. When the point of the 2D coordinate resides within the first zone, directly comparing with the ranges (the first algorithm) of the class A or the class B region is sufficient to determine the device activity status DAS robustly. However, when the point of the 2D coordinate resides in the second zone, i.e. neither in the class A region nor in the class B region, advanced computational manipulation (the second algorithm) is adopted instead.

Please now focus on FIG. 3. In one embodiment, the control signal generator 336 receives the device activity status DAS provided by the status decision module 334. When the control signal generator 336 find the that device activity status DAS changes from a first value corresponding to a user driving status to a second value corresponding to a user walking status, the control signal generator 336 generates the control signal CS. For another embodiment, the control signal generator 336 generates the control signal CS when also finding that the device activity status DAS stays temporarily at a third activity status during switching from the user driving status to the user walking status. For example, the third activity status may correspond to the transient stage during a user arising from a seat to leave a vehicle to a user walking with a regular pace.

Please turn to FIG. 3 and FIG. 1A for illustrative purpose of describing a calibration process. As mentioned earlier, the status decision module 334 may have access to a pre-stored mapping information between the device activity status DAS of the mobile device 100A and the vibration frequency VF and the vibration regularity VR. In one embodiment, the pre-stored mapping information is acquired from a calibration process executed for getting user specific ranges of the vibration frequency VF and the vibration regularity VR under different user activity status, i.e. the user driving status and the user walking status.

Specifically, the calibration process may have two phases. The first phase is performed while the mobile device 100A is with a user in a moving vehicle. During this phase, the motion detector 110 detects a motion of the mobile device 100 to obtain the motion signal MS. The motion signal MS may be stored in a storage module (not shown) of the mobile device 100A, serving as a portion of a reference signal for future determination of the device activity status DAS of the mobile device 100A. Furthermore, based on the motion signal MS obtained in the first phase of the calibration process, user specific ranges of vibration frequency and vibration regularity of the mobile device 10 in the user driving status can be optionally acquired. The same steps performed during the first phase can be performed during the second phase, in which the mobile device 100 is carried by the user walking, to obtain another portion of the reference signal. So, when determining the device activity status DAS, the reference signal (obtained in the calibration process), the vibration frequency VF, and the vibration regularity VR are taken into consideration. Hence, in one embodiment, the processing unit 130 is configured to: executed a calibration process with respect to the motion of the mobile device to obtain a reference signal; and determine the device activity status DAS of the mobile device 100A according to the vibration frequency VF, the vibration regularity VR and the reference signal.

Figure 5:
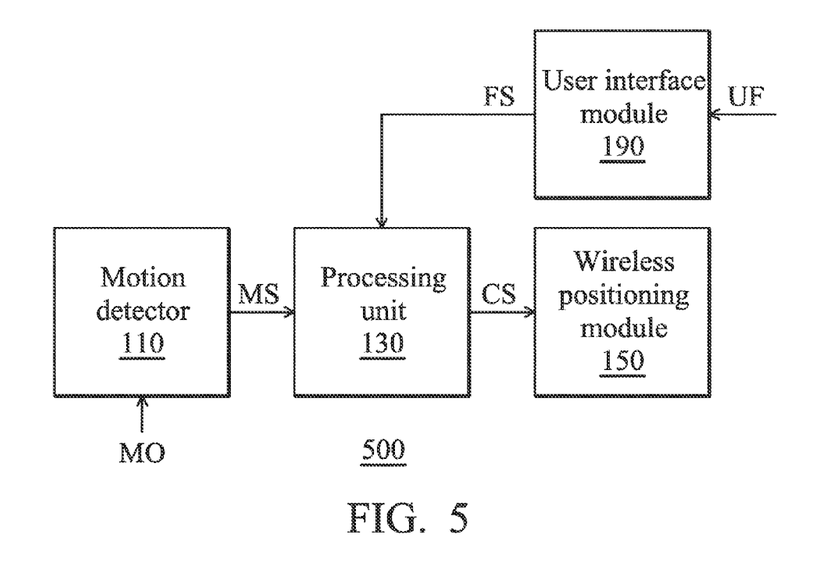
FIG. 5 shows a block diagram of a mobile device according to still another embodiment of the invention.

FIG. 5 shows a block diagram of a mobile device according to still another embodiment of the invention. The difference between FIG. 5 and FIG. 1A is the user interface module 190 is added. The user interface module 190 provides a user interface for prompting the user feedback UF with respect to accuracy of the first location provided by the wireless positioning module 150. For instance, after a user locates a parked vehicle according to the first location, the user interface module 190 may ask the user whether the first location accurately informs the exact parking location of the vehicle. If the user feedback UF indicates that the first location is accurate, then the feedback signal FS is assigned a first value; and miscellaneous settings and algorithms applied to the motion detector 110 and the processing unit 130 may remain unchanged. On the contrary, if the user feedback UF indicates that the first location is not accurate, the feedback signal FS is assigned second value; and aforementioned settings and algorithms may be adjusted accordingly. For instance, if the user feedback UF indicates that the first location provided by the wireless positioning module 150 locates within the path of the user being walking, it may imply the detection of the switching of the device activity status suffers obvious time delay. Then, the processing unit 130 may adjust settings to make the detection faster or adopt algorithms having higher detection convergence speed. In other words, the processing unit 130 is further configured to prompt the user feedback UF with respect to accuracy of the first location and the processing unit determines the device activity status of the mobile device further according to the user feedback UF.

Figure 6A:
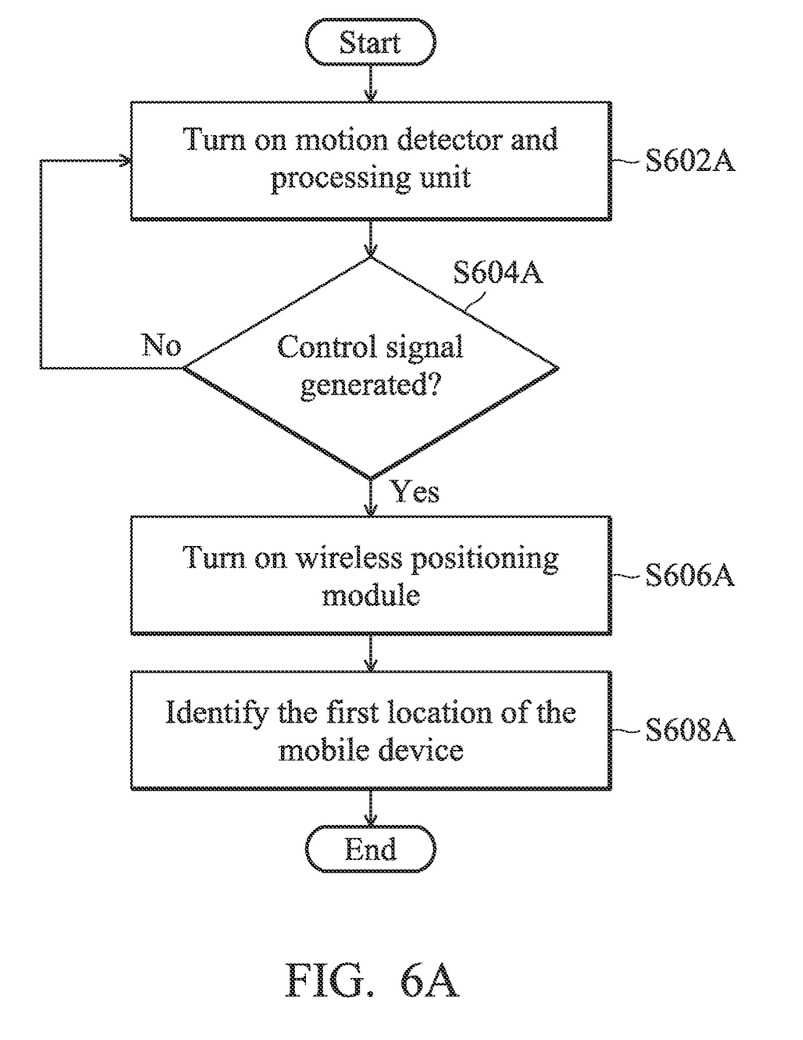
FIG. 6A illustrates an example operation flow of a mobile device according to an embodiment of the invention.

As power becomes a major issue in for mobile devices nowadays, below shows some other aspects of the invention according to some other embodiments. FIG. 6A illustrates an example operation flow of a mobile device according to an embodiment of the invention. Please view FIG. 6A together with FIG. 1A. In step S602A, the motion detector 110 and the processing unit 130 are turned on to perform their tasks. In other words, the motion detector 110 is configured to detect the motion MO of the mobile device 100A to obtain the motion signal MS. The processing unit 130, briefly speaking, generates the control signal CS according to the motion signal MS. In step S604A, it is observed whether the control signal CS is generated. If the control signal CS is not generated, the motion detector 110 and the processing unit 130 keep doing their tasks in step S602A. However, if the control signal CS is generated, the wireless positioning module 150 is turned on (step S606A). That is to say, the wireless positioning module 150 is turned on in response to the control signal CS. Of course, after turned on, the wireless positioning module 150 identifies the first location of the mobile device 100A (step S608A).

Figure 6B:
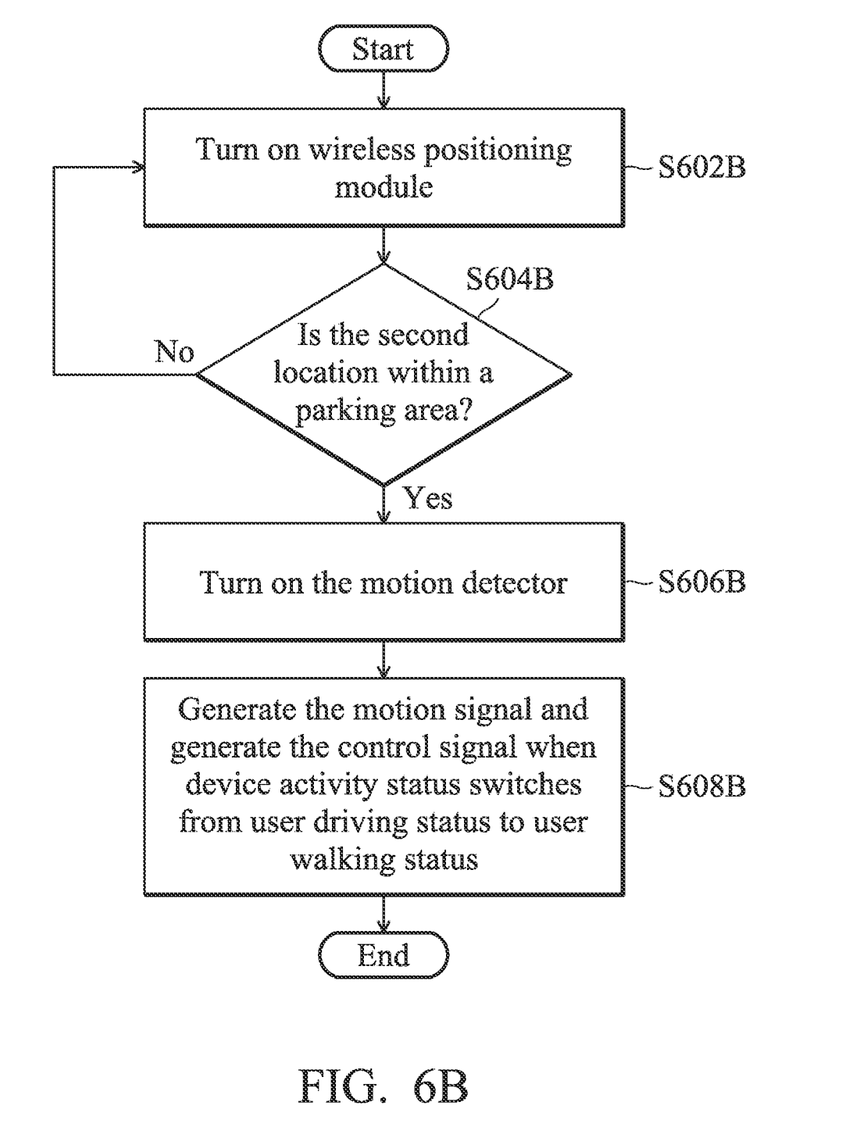
FIG. 6B illustrates another example operation flow of a mobile device according to an embodiment of the invention.

Please now turn to FIG. 6B and FIG. 1A. FIG. 6B illustrates another example operation flow of a mobile device according to an embodiment of the invention. In step S602B, the wireless positioning module 150 is turned on to identify a second location of the mobile device 100A. Then, it is judged whether the second location of the mobile device 100A resides within a parking area (step S604B), which is supported by many GPS modules with built-in or on-line geographic map information. If the second location resides within a parking area, implying that a vehicle is about to be parked, the motion detector 110 is turned on (step S606B) for detecting whether the vehicle is indeed parked. Then, the motion detector 110 generates the motion signal MS and the processing unit 130 processes the motion signal MS to generate the control signal CS when finding that the device activity status of the mobile device 100A switches from the user driving status to the user walking status (step S608).

Please refer back to FIG. 1A for still another embodiment for power saving, where a sampling rate of the motion signal MS is adjusted according to variation of the motion signal MS. During system startup, a default sampling rate of the motion signal MS is set. Then the motion detector 110 outputs the motion signal MS to the processing unit 130 at the default sampling rate. The processing unit 130 then analyzes the motion signal MS to obtain the variation of the motion signal MS, for instance the amplitude variation of the motion signal MS. When the processing unit 130 finds that the motion signal MS varies little, it may decrease the sampling rate so that the motion detector provides the motion signal MS with a sampling rate lower than the default sampling rate. Thus, in this embodiment, the processing unit 130 is further configured to obtain the variation of the motion signal MS, wherein the motion signal Ms is sampled at a sampling rate set according to the variation of the motion signal MS.

Figure 7:
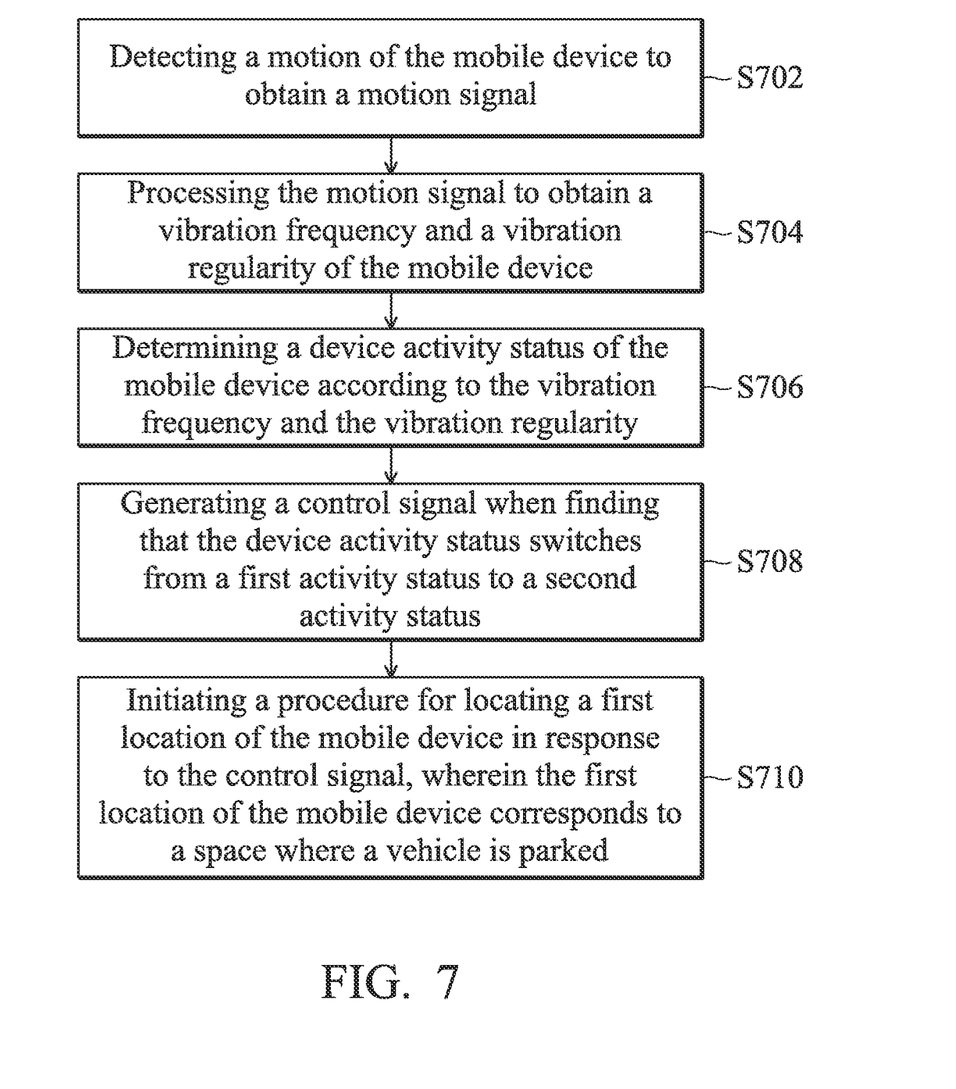
FIG. 7 is a flow chart illustrating a vehicle locating method for a mobile device having a motion detector according to some other embodiment of the invention.

FIG. 7 is a flow chart illustrating a vehicle locating method for a mobile device having a motion detector. In one embodiment, the vehicle locating method may be performed by the apparatus as shown in FIG. 1A, FIG. 1B, FIG. 1C or FIG. 2. In step S702, a motion signal is obtained by the motion detector detecting a motion of the mobile device. Then a vibration frequency and a vibration regularity of the mobile device are obtained by processing the motion signal (step S704). In step S706, a device activity status of the mobile device is determined according to the vibration frequency and the vibration regularity. Then, a control signal is generated when finding that the device activity status switches from a first activity status to a second activity status (step S708). In step S710, a procedure for locating a first location of the mobile device is initiated in response to the control signal. Note that the first location of the mobile device corresponds to a space where a vehicle is parked.

Note the steps above are not necessarily rendered fully sequentially. For example, steps S702 and S704 may be performed concurrently.

In one embodiment, the procedure for locating the first location of the mobile device comprises generating a sound in response to the control signal by an audio output interface. In another embodiment, the procedure for finding the first location of the mobile device comprises identifying the first location of the mobile device in response to the control signal by a wireless positioning module.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter.

The functionality discussed herein may be provided using a number of different approaches. For example, in some implementations a processor may be controlled by computer-executable instructions stored in memory so as to provide functionality such as is described herein. In other implementations, such functionality may be provided in the form of an electrical circuit. In yet other implementations, such functionality may be provided by a processor or processors controlled by computer-executable instructions stored in a memory coupled with one or more specially-designed electrical circuits. Various examples of hardware that may be used to implement the concepts outlined herein include, but are not limited to, application specific integrated circuits (ASICs), field-programmable gate arrays (FPGAs), and general-purpose microprocessors coupled with memory that stores executable instructions for controlling the general-purpose microprocessors.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile device, comprising:
    a motion detector having a power-saving mode and a detection mode, in the detection mode, the motion detector being configured to detect a motion of the mobile device to obtain a motion signal;
    a processor, configured to:
        process the motion signal to obtain a vibration frequency and a vibration regularity of the mobile device;
        determine a device activity status of the mobile device according to the vibration frequency and the vibration regularity; and
        generate a control signal in response to determining that the device activity status switches from a first activity status to a second activity status; and
    a wireless positioning module configured to identify a first location of the mobile device in response to the control signal and to identify a second location of the mobile device prior to identifying the first location of the mobile device such that the motion detector is triggered to operate in the detection mode to detect the motion of the mobile device in response to the second location residing within a parking area,
    wherein the processor determines the device activity status of the mobile device according to the vibration frequency and the vibration regularity by:
    mapping the vibration frequency and the vibration regularity to a point of a 2-dimension (2D) coordinate, wherein one axis of the 2D coordinate corresponds to the vibration frequency and the other axis of the 2D coordinate corresponds to the vibration regularity.

2. The mobile device of claim 1, further comprising an audio output interface configured to generate a sound in response to the control signal.

3. The mobile device of claim 1, wherein the wireless positioning module is turned on in response to the control signal.

4. The mobile device of claim 1, wherein the processor is further configured to obtain a variation of the motion signal, wherein the motion signal is sampled at a sampling rate set according to the variation of the motion signal.

5. The mobile device of claim 1, wherein the processor is further configured to:
    execute a calibration process with respect to the motion of the mobile device to obtain a reference signal; and
    determine the device activity status of the mobile device according to the vibration frequency, the vibration regularity and the reference signal.

6. The mobile device of claim 1, wherein the processor further determines the device activity status of the mobile device according to the vibration frequency and the vibration regularity by:
    distinguishing whether the point of the 2D coordinate resides within a first zone or a second zone; and
    adopting a first algorithm for determining the device activity status when the point of the 2D coordinate resides within the first zone; or
    adopting a second algorithm for determining the device activity status when the point of the 2D coordinate resides within the second zone.

7. The mobile device of claim 1, wherein the processor is further configured to prompt a user feedback with respect to accuracy of the first location and the processor determines the device activity status of the mobile device further according to the user feedback.

8. The mobile device of claim 1, wherein the first activity status is a user driving status and the second activity status is a user walking status.

9. The mobile device of claim 8, wherein the processor generates the signal also in response to the device activity status of the mobile device switching from the user driving status.

10. A vehicle locating method for a mobile device having a motion detector, comprising:
   detecting, by the motion detector, a motion of the mobile device to obtain a motion signal when turned on;
   processing the motion signal to obtain a vibration frequency and a vibration regularity of the mobile device;
   determining a device activity status of the mobile device according to the vibration frequency and the vibration regularity;
   generating a control signal in response to determining that the device activity status switches from a first activity status to a second activity status;
   initiating a procedure for locating a first location of the mobile device in response to the control signal, wherein the first location of the mobile device corresponds to a space where a vehicle is parked;
   identifying a second location of the mobile device prior to identifying the first location of the mobile device; and
   turning on the motion detector from a power-saving mode in response to the second location residing within a parking area,
   wherein the step of determining the device activity status of the mobile device comprises:
   mapping the vibration frequency and the vibration regularity to a point of a 2-dimension (2D) coordinate, wherein one axis of the 2D coordinate corresponds to the vibration frequency and the other axis of the 2D coordinate corresponds to the vibration regularity.

11. The vehicle finding method of claim 10, wherein the procedure for locating the first location of the mobile device comprises:
   generating, by an audio output interface, a sound in response to the control signal.

12. The vehicle finding method of claim 10, wherein the procedure for locating the first location of the mobile device comprises:
   identifying, by a wireless positioning module, the first location of the mobile device in response to the control signal.

13. The method of claim 12, wherein the wireless positioning module is turned on in response to the control signal.

14. The method of claim 10, further comprising:
   obtaining a variation of the motion signal, wherein the motion signal is sampled at a sampling rate set according to the variation of the motion signal.

15. The method of claim 10, further comprising:
   executing a calibration process with respect to the motion of the mobile device to obtain a reference signal; and
   determining the device activity status of the mobile device according to the vibration frequency, the vibration regularity and the reference signal.

16. The method of claim 10, wherein the step of determining the device activity status of the mobile device further comprises:
   distinguishing whether the point of the 2D coordinate resides within a first zone or a second zone; and
   adopting a first algorithm for determining the device activity status when the point of the 2D coordinate resides within the first zone; or
   adopting a second algorithm for determining the device activity status when the point of the 2D coordinate resides within the second zone.

17. The method of claim 10, further comprising:
   prompting a user feedback with respect to accuracy of the first location; and
   determining the device activity status of the mobile device further according to the user feedback.

18. The method of claim 10, wherein the first activity status is a user driving status and the second activity status is a user walking status.

19. The method of claim 18, wherein the control signal is generated also in response to determining that the device activity status of the mobile device switching from the user driving status.

* * * * *